April 24, 1956     E. O. RUHLIG     2,743,394
METHOD OF OPERATING COLD CATHODE STEPPING TUBES
Filed Feb. 24, 1953     2 Sheets-Sheet 1
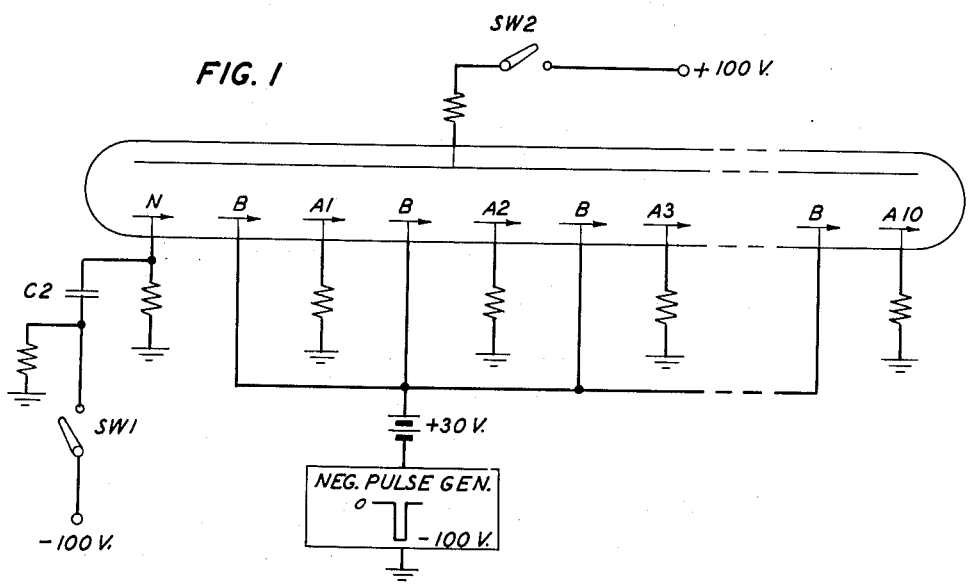
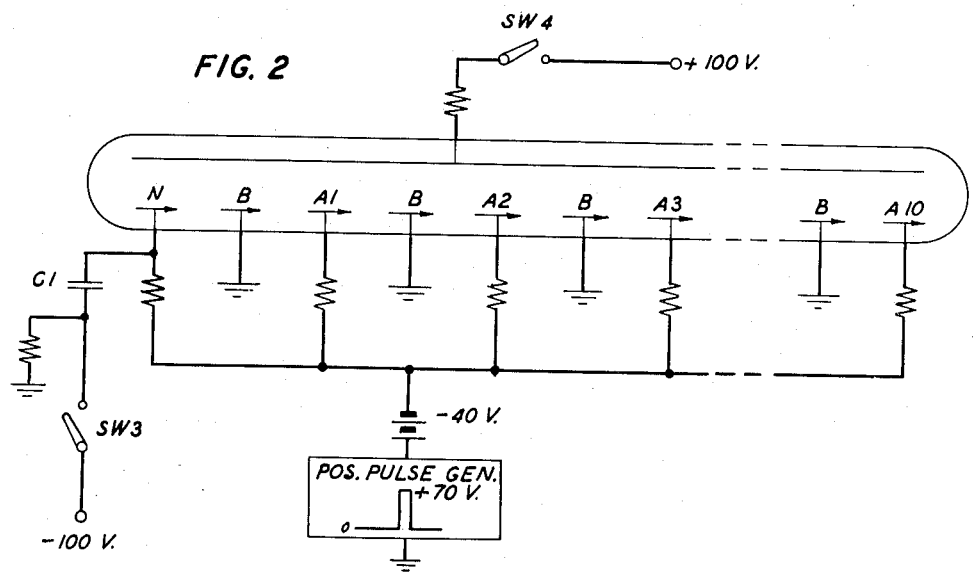
INVENTOR
E. O. RUHLIG
BY
*J. W. Schmied*
ATTORNEY 2,743,394
Patented Apr. 24, 1956

2,743,394

METHOD OF OPERATING COLD CATHODE STEPPING TUBES

Earl O. Ruhlig, Summit, N. J., assignor to Bell Telephone Laboratories, Incorporated, New York, N. Y., a corporation of New York Application February 24, 1953, Serial No. 338,462

3 Claims. (Cl. 315—84.6)

This invention relates to multiconductive position gas stepping tube circuits and more specifically to a circuit that allows a greater amount of usable power output to be obtained from gas stepping tubes.

An object of the invention is to obtain increased amounts of usable output power from multiconductive position gas stepping tubes of the type well known in the art.

Another object of the invention is to provide a more efficient means of operating multiconductive position gas stepping tubes so that smaller power supplies may be associated with them for a given power output.

This invention discloses a circuit in which the efficiency of operation and the maximum power output of the multiconductive position gas stepping tubes well known in the art today is substantially increased. This increased efficiency of operation allows a fixed value of current through a tube to produce a greater amount of power output. Also, with a fixed value of power output an increased efficiency allows less current to be drawn by the tube. The numerous advantages accruing from this increased efficiency are obvious. Smaller and lighter weight power supplies are needed to handle a fixed value of power output into the load circuit of the stepping tube. With fixed power capabilities of the tube, larger loads can be handled and also, in some cases, the use of intermediate stages of power relays or power amplifiers may be avoided.

The invention may be more fully understood from the following detailed description of a preferred embodiment thereof when read with reference to the accompanying drawings in which:

Fig. 1 illustrates the method in which gas stepping tubes have been operated up to the present time;

Fig. 2 illustrates a new and novel method of operating a gas stepping tube; and

Figure 3:
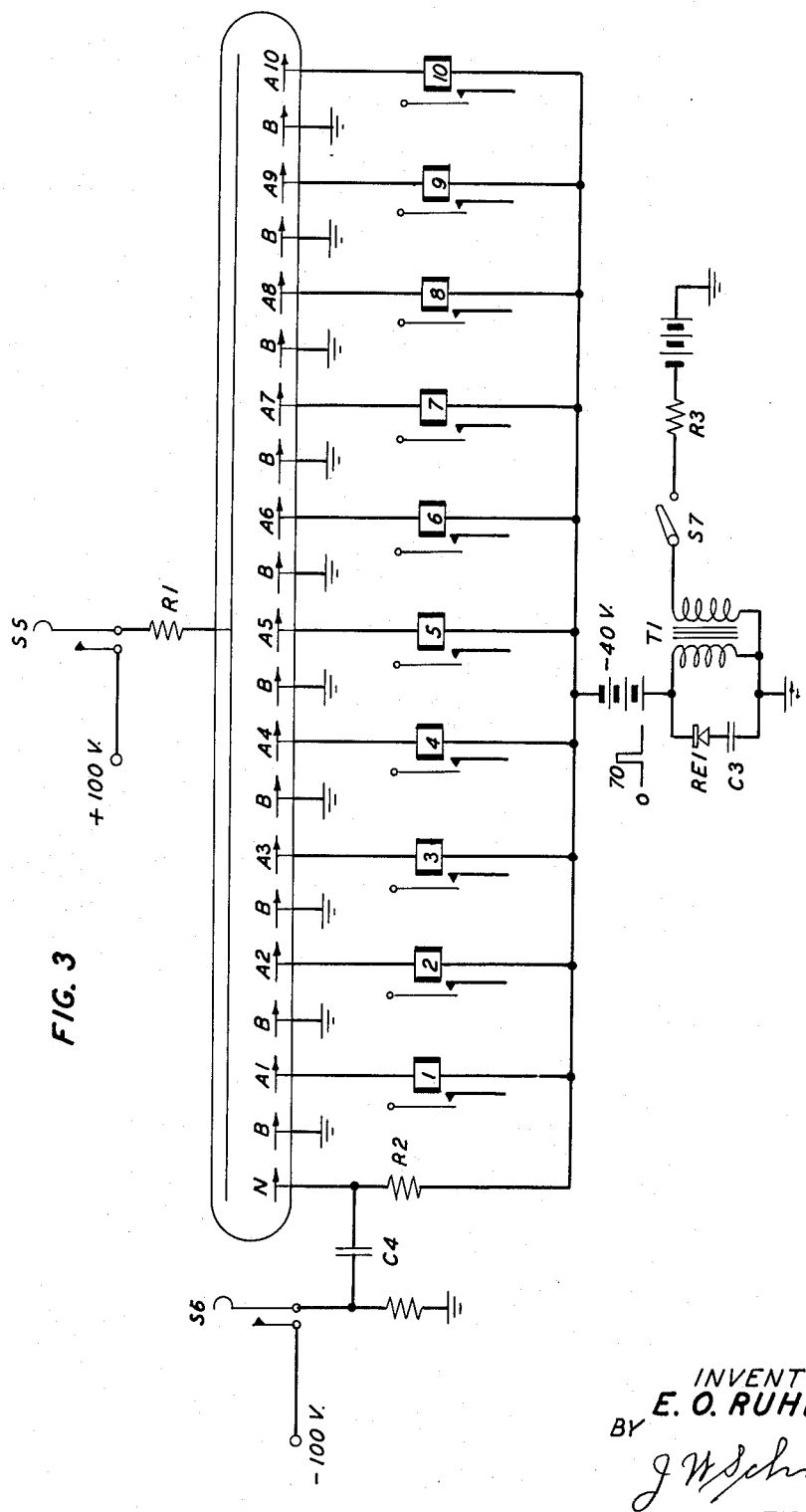

Fig. 3 discloses a preferred exemplary circuit that utilizes the new and novel method of operating a gas stepping tube.

Before proceeding further it is believed to be advantageous to discuss briefly the principles of operation of the type of tubes used herein. This description will be made with reference to the circuit of Fig. 1 which illustrates the heretofore commonly used method of operating such tubes.

The stepping tubes used herein are of the same type as shown in Patent 2,575,372 to M. A. Townsend, issued November 20, 1951, the disclosure of which is hereby incorporated into this specification the same as if fully set forth herein.

The tube is composed of an anode associated with a plurality of cathodes any one of which is capable of sustaining a conduction path to the anode. As shown on Fig. 1 alternate cathodes are designated B and are tied together to a common line. Interposed between the B cathodes, are cathodes designated A1, A2, A3 and so forth. Also adjacent the B cathode in the first stepping position is a normal cathode designated N.

When it is desired to initiate operation of the tube, switch SW2 is closed which places a 100-volt positive potential on the main anode. The resulting potential difference between the main anode and any of the A cathodes is 100 volts at this time while the potential difference between the anode and the B cathodes is 70 volts due to the plus 30-volt potential on the B cathodes. These potential differences between the anode and the cathodes are insufficient to initiate a discharge on their own. However, they are sufficient to sustain an already initiated discharge. When switch SW1 is momentarily closed it applies a negative 100-volt pulse to the N cathode which causes the tube to break down and initiate conductance between the N cathode and the anode. This negative 100-volt pulse applied through condenser C2 momentarily increases the potential difference between the anode and the N cathode to 200 volts, which is sufficient to initiate the above-mentioned discharge. When switch SW1 is released, conduction between the N cathode and anode is sustained solely by means of the positive 100-volt potential on the anode.

When it is desired to step the conduction position in the tube to another cathode, a negative 100-volt pulse is applied by the pulse generator, which may be of any type suitable for the purpose, in series with a 30-volt battery to the B cathode line. This changes the potential on the B cathode line from plus 30 to minus 70 and thereby increases the potential difference between the B cathodes and the anode to an instantaneous value of approximately 170 volts. The actual potential difference will be slightly less due to the voltage drop across the anode resistance. This increased potential difference causes the conduction to step from the N cathode to the B cathode in the first stepping position since the potential difference between the N cathode and the anode at this time is much less than that between the B cathode and the anode. As the first negative pulse terminates, the potential of the B cathode line rises to a plus 30 volts and thereby causes the discharge to advance to the A cathode designated A1 in the first stepping position. This transfer takes place because the potential difference between the A1 cathode and the anode is much greater than that between the B cathode and anode when the pulse terminates.

This above-described stepping action is repeated in response to the application of subsequent negative pulses from the pulse generator to the B cathode line. The tendency of the discharge to move in a forward rather than in a backward direction upon the reception of pulses from the pulse generator is governed by the shape and geometry of the tubes. This phenomenon is fully explained in the aforementioned Townsend patent. The final conduction position of the tube will be an indication of the number of negative pulses applied.

When it is desired to reset the tube, switch SW1 is momentarily closed which increases the potential difference between the N cathode and anode to such a great value that the discharge returns to that position. At this time the tube is again ready to receive and count additional negative pulses.

The foregoing description of the circuit of Fig. 1 has referred to the two groups of cathodes as the A cathodes and the B cathodes. Elsewhere in the art the A cathodes of the present disclosure are called the rest cathodes while the B cathodes of the present disclosure, which conduct only for the duration of a stepping pulse, are called the transfer cathodes. The exact terminology used is not important as long as it is kept in mind that the present A cathodes and B cathodes are comparable to the rest cathodes and the transfer cathodes respectively of the prior art.

In tubes of the type shown herein the current through the tube is limited by the fact that unreliable stepping action will result if the tube current exceeds a certain maximum value. In the circuit shown on Fig. 1 the B cathode circuit determines the maximum tube current inasmuch as the tube current is greater when conduction is occurring in a B cathode position than when in an A cathode position. The validity of this statement may be ascertained by observing that there are no resistors in the B cathode circuits and that the potential difference between the B cathodes and the anode is approximately 170 volts minus the small drop across the anode resistor when any one of the B cathodes is conducting. A comparison of the A cathode circuit for any position will reveal that not only is the maximum potential difference between an A cathode and the anode only 100 volts minus the voltage drops across the anode resistor at the time an A cathode is conducting, but also, there is a resistor in each A cathode circuit which further tends to reduce the tube current through that position to a value much lower than that for the B cathode position. Inasmuch as the A cathode resistors are the loads across which the useful power output of the tube is developed, it is readily seen that some means of providing increased tube current through the A cathode positions would be economically desirable. This desired increase of current through the A cathode positions cannot be achieved by merely raising the anode voltage or by lowering the value of the anode resistor since either of these expediences would also increase the current through the B cathode positions which initially have been designed for the maximum allowable current. When designing a circuit of this type, the current through the B cathode is designated to be close to the maximum figure allowable for the tube so that any extra current would result in erratic stepping action.

From the above analysis of the circuit in Fig. 1 it is obvious that the maximum value of current through the tube cannot be used to develop useful output power because of the requirement that the B cathode current be greater than the A cathode current.

Fig. 2 discloses a circuit that utilizes the new and novel method of operation whereby the maximum value of current through the tube is used to produce useful output power. In this circuit the B cathodes of each position are grounded while the A cathodes are connected together through their individual cathode resistors to a negative 40-volt battery, the positive terminal of which is connected in series with a pulse generator to a ground potential. The pulse generator may be of any type that is suitable for the purpose.

Switch SW4 is first closed when it is desired to discharge the tube. This closing effects no conduction in the tube at this time since the potential on the anode is insufficient to initiate a discharge even though it is sufficient to sustain an initiated discharge. When switch SW3 is momentarily closed, a negative 100-volt pulse is applied through condenser C1 to the normal cathode which causes a discharge to take place between the normal cathode and the anode. After switch SW3 is released conduction will continue in this position due to the positive 100-volt potential on the anode and the negative 40-volt battery connected to the lower part of the N cathode resistor.

When it is desired to step the tube, a positive 70-volt pulse is generated by the pulse generator in series with the negative 40-volt battery which places a potential of plus 30 volts with respect to ground on the A cathode line and on the N cathode at this time. Upon the reception of the first pulse, the discharge will advance to the B cathode in the first stepping position because the potential difference between the B cathode and the anode being 100 volts minus the small drop across anode resistor at this time is much greater than that between the N cathode and anode which is approximately 70 volts at this time.

As the positive pulse terminates, the voltage of the A cathode line returns to a negative 40 volts which causes the discharge to advance to the A1 cathode due to the greater potential difference between this cathode and the anode than that between the B cathode and the anode.

This above-described action will be repeated for the reception of subsequent pulses so that the final conductive position of the tube will be indicative of the number of pulses received from the pulse generator.

This circuit has the advantage that the potential on the A cathodes and the value of the A cathode resistors, may be chosen so as to produce a current through the A cathode circuits equal to the maximum value of current allowed for the tube. This current may be adjusted by making the negative battery associated with the A cathodes either larger or smaller as may be needed for the purposes involved. This maximum amount of current flowing through an A cathode and its associated load as represented by the A cathode resistors will result in the maximum amount of power possible being developed in the output circuit. The current through the B cathodes is much lower than that through the A cathodes since the potential that energizes this circuit is much less than that which energizes the A cathode circuits. In practice the anode potential and the value of the anode resistor is chosen so as to produce a low value of current through the B cathode circuits. With the anode potential and the value of the anode resistor having been ascertained, the value of the A cathode resistors and the potential on the A cathodes is chosen so as to produce the maximum value of current allowable through the tube at the time the A cathodes are conducting.

Fig. 3 illustrates an exemplary preferred embodiment of a circuit utilizing the applicant's new and novel method of operating gas stepping tubes. In this circuit the stepping of a tube to a final conductive position will energize a relay in the cathode circuit of the final conductive position. The operation of this relay can then initiate the operation of additional circuits means exclusive to the conducting cathode position. The cathode relays shown in Fig. 3 bear the designations of 1 through 10. The contacts shown associated with each relay may be used to actuate the circuit that is to be operated.

Switch S5 is closed when it is desired to operate the tube. No discharge occurs at this time since the potential difference between the anode and cathodes is insufficient to initiate a discharge. Switch S6 is momentarily closed when it is desired to discharge the tube which causes a negative 100-volt pulse to be transmitted through condenser C4 to the normal cathode of the tube. The resulting increase in the potential difference between the N cathode and the anode causes a discharge to take place between these two elements. The discharge will remain in this position after the negative pulse from S6 subsides and will remain there until a positive pulse is generated by transformer T1.

Switch S7 is momentarily operated and released for each pulse that is desired to be sent to the A cathode line and to the N cathode in order to step the tube. The closing and opening of switch S7 causes the secondary of transformer T1 to generate a positive 70-volt pulse which places the A cathode line and the N cathodes at an instantaneous potential of plus 30 volts with respect to ground. This causes the B cathode adjacent the N cathode to seize control of the discharge for the duration of the positive pulse. When switch S7 is released condenser C3 and rectifier RE1 effectively short-circuit the negative pulse generated by T1 due to the quick decay of current in its primary.

As was shown in conjunction with the circuit of Fig. 2, the discharge in the tube will advance from the N cathode to the first B cathode upon the reception of the first pulse. As the pulse terminates the conductive position advances to the A1 cathode in the first stepping position. This action is repeated in response to the reception of subsequent pulses so that the ultimate conductive position of the tube will be indicative of the number of pulses applied.

Relays 1 through 10 are of the slow-operate type so that the relay in each position will not operate in response to the stepping of the tube. However, when the conduction in the tube assumes a final position at the termination of the reception of the pulses applied, the relay associated with this ultimate conductive position will operate. The operation of this relay could effect any subsequent action that may be desired, such as the operation of an auxiliary circuit or additional apparatus. If desired, the relays designated 1 through 10 could be replaced by resistors so that the IR drop across the resistor in the final conducting position would be an indication of the number of digits applied. In such a case, subsequent circuits would have to be arranged so as to be responsive to a voltage drop rather than to the operation of a pair of contacts.

The drawings and the circuits shown therein are merely exemplary and many modifications could be made therefrom without departing from the scope of the invention. For example, the tubes could have any desired number of conductive positions associated with them as may be determined by the requirement of the particular circuit in which the tubes are to be used. Also, the pulse generators contained in these figures are shown only for the purpose of simplicity and could be of any type desired.

It is to be understood that the above-described arrangements are but illustrative of the application of the principles of the invention. Numerous other arrangements may be advised by those skilled in the art without departing from the spirit and scope of the invention.

What is claimed is:

1. In a multiconductive position gaseous discharge tube that is adapted to advance the conductive position within said tube from position to position in response to the application of pulses thereto, an anode connected to a positive source of potential, a first group of cathodes connected together to a ground source of zero potential, a second group of cathodes the individual ones of which are alternately interposed between individual cathodes in said first group of cathodes, a plurality of load impedances, one terminal of each of which is individually connected to a separate cathode in said second group of cathodes, the other terminal of each of said impedances being connected together and in turn connected to a negative terminal of a second source of potential, a pulse generator connected between the positive terminal of said last-named source of potential and an electrical ground of zero potential.

2. In a multiconductive position gaseous discharge tube that is adapted to advance the conductive position within said tube step by step from cathode to cathode in response to the application of pulses thereto, an anode connected to a source of positive potential, a first group of cathodes each of which is exclusively connected to and associated with an individual one of a plurality of load impedances, a second source of potential the negative terminal of which is connected through said plurality of impedances to each cathode in said first group of cathodes, a pulse generator connected between the positive terminal of said last-named source of potential and an electrical ground of zero potential, and a second group of cathodes each of which is directly connected to said electrical ground of zero potential and each one of which is physically interposed between two cathodes in said first group of cathodes.

3. In a circuit of the class described, a multiconductive position gaseous discharge tube in which the conductive position therein can be advanced from position to position in response to the application of pulses thereto, a plurality of rest cathodes each of which is individual to a different conductive position within said tube, each of said rest cathodes being connected to a source of negative potential, a plurality of transfer cathodes each of which is positioned between two of said rest cathodes, each of said transfer cathodes being connected directly to a ground source of zero potential, an anode connected to a positive source of potential, and means for applying positive pulses to said rest cathodes to step the conductive position in said tube from position to position.

References Cited in the file of this patent
UNITED STATES PATENTS

| | | |
|---|---|---|
| 2,553,585 | Hough | May 22, 1951 |
| 2,575,370 | Townsend | Nov. 20, 1951 |
| 2,607,015 | Townsend | Aug. 12, 1952 |
| 2,608,674 | Depp | Aug. 26, 1952 |
| 2,627,054 | Hough et al. | Jan. 27, 1953 |